United States Patent Office 3,455,741
Patented July 15, 1969

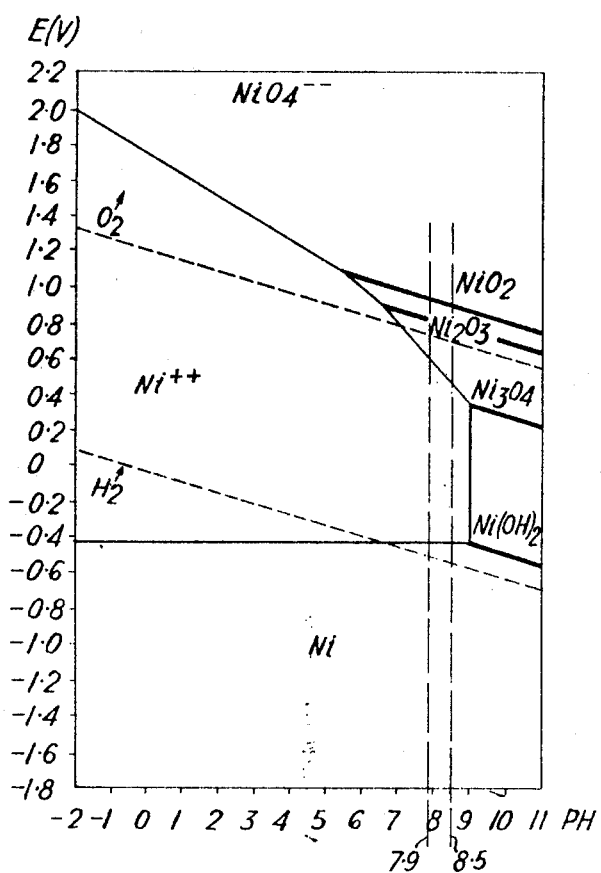
Friedrich A. Schneider
Inventor
By M. L. Pinel
Attorney

3,455,741
METHOD FOR PRODUCING NICKEL
ACCUMULATOR PLATES
Friedrich August Schneider, Neunen, Netherlands, assignor to The International Nickel Company, Inc., New York, N.Y., a corporation of Delaware
Filed Nov. 15, 1965, Ser. No. 507,764
Claims priority, application Great Britain, Nov. 16. 1964, 46,571/64
Int. Cl. H01m 35/18, 43/04
U.S. Cl. 136—76                           15 Claims

ABSTRACT OF THE DISCLOSURE

Accumulator plates are produced from porous nickel plaques by electrolytic oxidation of the plaque in an aqueous sodium bicarbonate solution wherein the current used is a positive pulsating current.

---

This invention relates to the production of porous nickel plates which are to be used as accumulator plates and which carry a coating of a black nickel hydroxide. It is known that accumulator electrodes comprising porous nickel plates having the pores thereof impregnated and/or coated with a black nickel hydroxide are useful in the construction of alkaline accumulators such as the nickel-cadmium accumulator cell. Processes have been known for producing such accumulator electrodes by means of anodically oxidizing porous nickel plates made, for example, by the sintering of nickel powder in an alkaline solution such as a saturated solution of sodium bicarbonate. The electrolytic oxidation process provides active black nickel hydroxide within and upon the porous nickel plate and it is generally considered this black nickel hydroxide may be represented by the formula $NiO(OH)$.

One process for producing such plates, involving oxidation of porous nickel plates, is described in British patent specification No. 469,453. In this process, the porous nickel plates are subjected to electrolysis, as anodes, in an electrolyte consisting of a solution of sodium bicarbonate and the electrolyte either is replenished as necessary during the process or has gaseous carbon dioxide added continuously to it to prevent the formation of sodium carbonate. A steady direct current is used in the process. However, this process is extremely slow and the results obtained are generally not reproducible.

The process can be improved by continuously recirculating the electrolyte and by strictly maintaining the pH of the electrolyte within the range 7.9 to 8.5, especially along the outer surface of the anodes. This control can be effected, for instance, by adding gaseous carbon dioxide to the continuously circulating electrolyte, the flow of carbon dioxide being controlled by a glass electrode pH meter. The process is, however, still slow. A rate-controlling factor is the value of the direct current passed but, in practice, there is an optimum current value above which the process operates even less satisfactorily because nickel ions are driven into the bulk of the solution by anodic dissolution from the nickel plate.

It is an object of the present invention to provide an improved process for producing porous nickel accumulator plates impregnated and/or coated with black nickel hydroxide which process is carried out in a materially reduced time as compared to prior processes.

It is a further object of the invention to provide a process for producing porous nickel accumulator plates having the pores thereof substantially completely impregnated with a black nickel hydroxide.

Other objects and advantages of the invention will become apparent from the following description.

Broadly stated, the present invention is directed to the anodic oxidation of porous nickel plates to impregnate the pores thereof with a black nickel hydroxide in a substantially reduced time comprising anodically oxidizing a porous nickel plate in a concentrated aqueous solution of sodium bicarbonate using a positive pulsating current while maintaining the electrolyte pH between about 7.9 and about 8.5 and while continuously recirculating the electrolyte throughout the process in order to maintain uniform conditions along the outer surface of the anodes.

According to the present invention the current used for the electrolytic oxidation, which is conducted in a sodium bicarbonate solution which is continuously recirculated, is a positive pulsating current. The electrolyte is continuously recirculated in order to maintain uniform conditions along the outer surfaces of the anodes.

It can be shown that the anodic oxidation of porous nickel bodies to form nickel hydroxide in a circulating sodium bicarbonate solution is a two step reaction. This can be understood from the Pourbaix diagram for nickel, which is shown in the accompanying drawing. During electrolysis the anode potential always lays more or less above the $O_2$ potential line, the process involving oxygen evolution. This means that in an electrolyte with a pH value between 7.9 to 8.5 a flat nickel surface will be always passive, since although the oxygen evolution creates $H^+$ ions the circulation of the electrolyte prevents a sufficient decrease of the pH value in the surface layer on the electrode. However, in a porous body the oxygen evolution by electrolysis results in a sharp decrease in the pH value in the electrode surface layer and its environments inside the porous system, thus creating nickel activity and dissolution of $Ni^{2+}$ ions. These ions are oxidised and precipitated by hydrolysis as soon as they reach areas with a sufficiently high pH value.

Now, if the pH value of the electrolyte is above 8.5, the outer surface of the porous plate remains passive and its colour does not change to black since the electrolysis cannot decrease the pH value in the surface layer of this region sufficiently to create activation. Only inside the porous plate is there activation, and formation of black $NiO(OH)$. Below pH 7.9 there is too much $NiO(OH)$ precipitated on the outer surface of the plate, and this tends to blister after some time.

At high current densities (D.C.) the pH in the pores of the plate decreases so much that part of the nickel ions cannot precipitate before they are driven into the bulk of the electrolyte by the gas stream evolving from the pores. This happens quicker as the pH of the electrolyte approaches its lower limit of 7.9, which is for this reason the minimum pH value at which the process can be conducted satisfactorily. In any case a pH value below 7.9 cannot be maintained at low cost because a $CO_2$ pressure above 1 atmosphere is required for it and so, even if the current density and other conditions of operation could be chosen satisfactorily, the process would not be acceptable economically. It is the decrease of the pH value in the electrode surface layer that requires the application of the highest current density and in the invention dissolution of the nickel occurs primarily during the periods of high current density while the hydrolysis of the dissolved nickel occurs mainly during the periods of low current density. By using a pulsating current a higher mean current density can be used and thus plates of a given capacitance can be produced more quickly than when a steady direct current (D.C.) of the optimum value is used or, alternatively, in a given time plates of a higher capacitance can be obtained. If a steady direct current density above the optimum were applied, on the other hand, nickel ions would be driven into the bulk of the solution.

This precipitation can be seen and the optimum current density is the maximum current density which can be used without this precipitation occurring.

As an example, a plate having a thickness of about 1 mm. and a porosity of between 68% and 72% and which has been made by roll compaction of carbonyl nickel powder, and which does not contain a grid, generally has an optimum current density of 20 ma./cm.$^2$, while using a pulsating current, the mean current density can be 25 ma./cm.$^2$, an increase of 25%.

The nickel plates for alkaline batteries which are to be anodically oxidised in the invention must be very porous in order that they may have a large area which can be activated by the black nickel hydroxide coating. For example, they should have a porosity of from 50% to 90%, preferably above 70%. They will generally have a thickness of not more than three millimetres (mm.), although thicker plates may be made. The plates may be made by various methods. Thus, they may be made by loose sintering, by a slurry technique or by roll compaction. With plates having a thickness of more than about 1, or at most 1.5 mm., it is highly preferred that they should contain an inner metal grid since then oxidation not only starts from the outer surface of the plates but also starts to grow from the grid surface, inside the porous body during the oxidation. This happens because the presence of the grid changes the potential distribution along the inner surface of the porous body, the conductivity of the nickel grid being distinctly higher than that of the porous nickel body (see: Tracey and Perks, Powder Metallurgy, 1963, No. 12, p. 60, table II). For example, the resistivity of compact Nickel is 6.05 microohm cm. while that of sintered nickel bodies is between 60 and 110 microohm. Care must, however, be taken to see that the grid does not poison the plates and upset the oxidation process but this risk can usually be reduced by plating the grid with a coating of nickel or by using pure nickel grids. The method of producing plates having an inner grid and which is described and claimed in British patent application No. 5,890/63 is particularly suitable. For plates less than 1.5 mm. thick, it is not essential for them to contain metal grids, although it is highly advantageous that they should, if they are to be used for positive alkaline battery plates.

In any process of making the plates which involves loose sintering, this sintering should be carried out in such a way that the metal bonds in the porous body are so strong that the attack by the oxidation process does not weaken them to a dangerous degree. In general, therefore, the highest possible sinter temperature should be used.

The sodium bicarbonate electrolyte used in the invention preferably has a concentration of from 80 to 135 grams per litre (g./l.) and is preferably maintained during the process at a temperature of from 50° C. to 70° C. At temperatures below 50° C. nickel tends to dissolve into the bulk of the electrolyte while at temperatures above 70° C. salt crystals are shed from the electrolyte and encroach along the lugs of the plates and along the walls of the container in which the electrolysis is being carried out. The solution is preferably an almost saturated solution at the temperature at which it is being used. For instance, it is generally preferred to use a solution having a concentration of 130 grams per litre, since this is almost saturated at a temperature of 55° C., which is a preferred temperature.

The process may be conducted with the pH of the electrolyte being maintained within any narrow range within the range 7.9 to 8.5. For instance, satisfactory results for 1 mm. thick plates can be obtained if the electrolyte is maintained within the range 8.3 to 8.5. Using pulsating current the pH value can be reduced to 8.1 to 8.3 and for thicker plates it is preferred that the pH should be kept between 8 and 8.2.

The optimum values for the basic current density, the maximum current density, the frequency of pulsing and the relative durations of the pulses are, in general, interrelated and will depend also on the particular plates being used. In practice, however, the mean current density will always, in the process of the invention, be greater than the optimum value of the steady direct current which can be applied.

The frequency of pulsing is not critical, but it is, however, controlled by the fact that if the high pulse, that is to say, the pulse during which the current density is above the mean current density, is too long, the disadvantage which arises with high D.C. of nickel going into solution arises, while if the high pulse is too short, sufficient dissolution of nickel does not occur during the pulse because the pH value in the electrode surface layers cannot be decreased sufficiently. Generally, the high pulse must be on for at least 0.2 second and best results are obtained with a high pulse lasting for from 0.4 to 1 second.

The low pulse, i.e., the pulse during which the current density is below the mean current density, must be long enough to hydrolyse nickel salt which has been brought into solution during the high pulse. The optimum high pulse/low pulse time ratio will depend, to some extent at least, on the value of the high current density during the period of high density, the greater being this current density the longer being the period of low current density needed to permit the dissolved nickel to be hydrolysed to the hydroxide. Thus the frequency of the pulsating current should be below 4 cycles per second (4 Hz.), while there is no value in going below one quarter cycle per second.

The value of the basic current density should not be greater than the value which is the optimum when a steady direct current is passed, but it should be greater than zero. For example, if the optimum for a steady D.C. was 20 ma./cm.$^2$, the basic current density is preferably from 1 to 20 ma./cm.$^2$, and if the optimum for a steady D.C. was 25 ma./cm.$^2$, the basic is preferably from 1 to 25 ma./cm.$^2$. It is often preferable that the basic current density should be greater than 10 ma./cm.$^2$. The current density is calculated on the apparent surface area obtained by multiplying the length of the surface by the width.

The maximum current density is generally preferred to be less than five times the optimum D.C. current density. In addition to the requirement that the maximum should not be too high, so also should the mean not be too high, as otherwise passivation still occurs, after about one third of the electrolysis time. This occurs because after this period most of the inner surface of the porous plate is covered with NiO(OH) and the current density at the remaining nickel surface is so high that the anode potential reaches a value which is within the passive NiO$_2$ region and cannot be brought into the region of activation by lowering the pH.

Under these circumstances the current efficiency of the oxidation process is only a few percent and although under these conditions the current produces almost only oxygen, and H$^+$ ions, the decrease of the pH value is limited because now the reduced pH produces CO$_2$, the bicarbonate reacting to form carbonate, and this results in the pH being buffered so that it no longer can be reduced to a value at which the nickel becomes active again. For this reason, in general, the mean current density is preferably not greater than 1.5 times the optimum direct current density. For the same reason, the total electrolysis time for 1 mm. thick porous nickel plates, without an incorporated grid can be more efficiently brought down to 25 hours with a mean current density 1.25 times the optimum D.C. density than with 1.75 times that value.

It is also favorable to reduce substantially, e.g., by half, the maximum current density after the electrolysis has been proceeding for some time as this can result in a considerable saving in current without prolonging unduly the duration of the electrolysis. For instance, the maximum current density can be reduced to half its value after from 16 to 25 hours, 20 hours being a convenient duration for the initial stage, for high porosity 3 mm. thick plates including a nickel grid.

The current density preferably pulsates with square pulses, these being preferred because they can readily be generated at the low frequencies involved in the invention, but other pulses, for example, sinusoidal or sawtooth pulses, may be used. Some examples of the invention are now given.

Example 1

Three sets of nickel sheets without a grid and 1 to 1.2 mm. thick with 70% porosity, were anodically oxidised until they had a current capacity of 30 mah./cm.$^2$, thus rendering them suitable for use in nickel-cadmium alkaline accumulators.

The first set of plates were merely subjected, as anodes, to electrolysis in a concentrated solution of sodium bicarbonate at 50° C., gaseous carbon dioxide being formed. A steady direct current yielding a density of 20 ma./cm.$^2$ was passed. Variable results were obtained but the process usually had to be carried out for 80 hours or more before the required current capacity was obtained.

The second set of plates were subjected to electrolysis, as the anodes, in a sodium bicarbonate solution which had a concentration of 130 g./l., which had a temperature of 60° C., which was continuously recirculated past the anodes and to which the carbon dioxide was added as necessary to maintain its pH within the range 8.3 to 8.5. A steady direct current yielding a current density of 20 ma./cm.$^2$ was passed. The process had to be carried out for from 50 to 55 hours before the required current capacity was obtained.

The third set of plates were subjected to anodic oxidation according to the invention. The electrolyte was a solution of sodium bicarbonate having a concentration of 130 g./l. and had a pH of 8.1 to 8.3 and a temperature of 55° C. The solution was continuously circulated past the anodes and carbon dioxide added as necessary to maintain its pH constant. A direct current on which a square pulse current was superimposed was passed, the basic current density being 10 ma./cm.$^2$ and the maximum current density of the square pulse being 60 ma./cm.$^2$, 3 times the optimum D.C. density. The frequency of pulsing was ½ cycle per second and the high pulse, low pulse time ratio of the square pulses was 3:7, with the result that the mean current density throughout the process was 25 ma./cm.$^2$, that the mean was 1.25 times the optimum D.C. density and that the pulses lasted 0.6 second. This process only had to be carried out for about 25 hours for the plates to have the required capacity of 30 mah./cm.$^2$.

Example 2

3 mm. thick plates having a stretched nickel grid and which had been produced by a process as described in specification No. 5,890/63 were electrolytically oxidised in a sodium bicarbonate electrolyte having a temperature of 55° C., a concentration of 130 grams per litre and a pH of between 8.1 and 9.2. The electrolysis was carried out using a pulsating current of ½ cycle per second having a high pulse/low pulse ratio of 3:7, a maximum current density of 60 ma./cm.$^2$ and a minimum current density of 10 ma./cm.$^2$, with the result that the mean current density was 25 ma./cm.$^2$. After passing this current for 52 hours the plates had a capacity of 65 mah./cm.$^2$. In other tests using these plates and the same electrolyte it was found that the results deteriorated when the maximum current density was 80 ma./cm.$^2$ or higher.

Comparison of Example 2 with the third set of plates of Example 1 shows that using the same pulsating current for 1 mm. thick plates without a grid and 3 mm. plates containing a stretch metal nickel grid, the total oxidation time per unit thickness in both cases is almost the same.

The 1 mm. plates gained a capacity of 15 mah./cm.$^2$ after the first 6 hours. Thereafter the oxidation speed slowed down to an almost linear value of somewhat more than 7 mah./cm.$^2$ for 10 hours, finally resulting in a total gain of about 30 mah./cm.$^2$ after 26 hours. The 3 mm. plates gained a capacity of about 40 to 41 mah./cm.$^2$ after 10 hours, this corresponding to the greater inner surface. Thereafter the oxidation speed slowed down to an almost linear value of somewhat more than 5 mah./cm.$^2$ for 10 hours, finally resulting in a total gain of 65 mah./cm.$^2$ after 52 hours. It is shown from photographs of partially oxidised plates of both types that, this striking effect is due to the presence of the grid, which enables the oxidation to start from the grid surface within the porous body of the plate as well as from the outer surface of the plate.

For 3 mm. plates without a grid, the total oxidation time to a capacity of 65 mah./cm.$^2$ can be estimated at 75 to 80 hours. This estimation is made as follows:

At least $3 \times 6$ hours=18 hours, to yield a capacity of 40 to 45 mah./cm.$^2$ and thereafter half the oxidation speed as obtained for 1 mm. plates, this being 3.5 mah./cm.$^2$, for 10 hours to yield remaining 20 to 25 mah./cm.$^2$, this being about a further 60 hours, which gives a total of 75 to 80 hours.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a process for the production of an accumulator plate from a porous nickel plaque by the formation of a coating of black nickel hydroxide derived from nickel initially present in the plaque by electrolytic oxidation of said plaque in an aqueous sodium bicarbonate solution having a pH of about 7.9 to about 8.5 which is continuously recirculated, the improvement characterized in that the current used is a positive pulsating current.

2. A process according to claim 1 in which the pH of the electrolyte is from 8.1 to 8.3.

3. A process according to claim 1 in which the pH of the electrolyte is from 8.3 to 8.5.

4. A process according to claim 1 in which the pH is from 8.0 to 8.2.

5. A process according to claim 1 in which the plate has a thickness of greater than 1 mm. and contains a metal grid.

6. A process for the production of an accumulator plate, the process comprising subjecting a porous nickel plate to electrolysis in an aqueous sodium bicarbonate solution having a pH of from 7.9 to 8.5, a concentration of from 80 to 135 grams per litre of sodium bicarbonate and a temperature of from 50 to 70° C. with a positive pulsating current in which the pulses of high current density last for from 0.2 to 1 second and in which the frequency is between 4 cycles and ¼ cycle per second.

7. A process according to claim 6 in which the pH is from 8.0 to 8.2.

8. A process according to claim 6 in which the duration of the pulses of high current density is from 0.4 to 1 second.

9. A process according to claim 6 in which the sodium bicarbonate solution has a concentration such that at the temperature of operation the solution is almost saturated.

10. A process according to claim 9 in which the solution has a concentration of 130 grams per litre of sodium bicarbonate and is used at a temperature of 55° C.

11. A process according to claim 6 in which the plate has a thickness of greater than 1 mm. and contains a metal grid.

12. A process according to claim 6 in which the maximum current density is less than 5 times the optimum D.C. density.

13. A process according to claim 6 in which the mean current density is less than 1.5 times the optimum D.C. density.

14. A process according to claim 6 in which the maximum current density is reduced substantially after 20 hours or more.

15. A process according to claim 6 in which the porous nickel plate has a porosity of about 50% to about 90%.

References Cited

UNITED STATES PATENTS

| 3,317,347 | 5/1967 | Coleman et al. | 136—28 |
| 3,335,033 | 8/1967 | Kober | 204—56 XR |

FOREIGN PATENTS 469,453   7/1937   Great Britain.

JOHN H. MACK, Primary Examiner

G. L. KAPLAN, Assistant Examiner

U.S. Cl. X.R.

136—29, 75; 204—56